US009800533B2

(12) United States Patent
Glick

(10) Patent No.: US 9,800,533 B2
(45) Date of Patent: Oct. 24, 2017

(54) AUTOGENERATION OF APPLICATION FOR A SOCIAL NETWORK

(71) Applicant: Google Inc., Mountain View, CA (US)

(72) Inventor: Brian Glick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 552 days.

(21) Appl. No.: 14/047,976

(22) Filed: Oct. 7, 2013

(65) Prior Publication Data

US 2017/0048183 A1    Feb. 16, 2017

(51) Int. Cl.
*G06F 15/16* (2006.01)
*H04L 12/58* (2006.01)

(52) U.S. Cl.
CPC ................... *H04L 51/32* (2013.01)

(58) Field of Classification Search
CPC ........................................................ H04L 51/32
USPC ........................................................ 709/204
See application file for complete search history.

(56) References Cited

U.S. PATENT DOCUMENTS

| | | | | |
|---|---|---|---|---|
| 2010/0004004 A1* | 1/2010 | Browne-Swinburne | | H04W 4/02 455/457 |
| 2010/0257186 A1* | 10/2010 | Dewar | ................. | G06Q 10/107 707/749 |
| 2011/0093790 A1* | 4/2011 | Maczuba | .......... | G06F 17/30902 715/745 |
| 2013/0110641 A1* | 5/2013 | Ormont | ................... | G06Q 50/01 705/14.66 |
| 2013/0124625 A1* | 5/2013 | Cathcart | ........... | G06F 17/30861 709/204 |
| 2013/0130645 A1* | 5/2013 | Pousti | ..................... | G06Q 20/16 455/406 |
| 2013/0179502 A1* | 7/2013 | Faller | .................... | H04L 65/403 709/204 |
| 2014/0244488 A1* | 8/2014 | Kim | ..................... | G06Q 20/123 705/39 |
| 2016/0155059 A1* | 6/2016 | Ruffner | ............. | G06F 17/30873 706/11 |

* cited by examiner

*Primary Examiner* — Yves Dalencourt
(74) *Attorney, Agent, or Firm* — Lowenstein Sandler LLP

(57) ABSTRACT

A method for generating an application for sharing with users of a social network includes identifying a community for sharing community content related to a topic of interest. The community is associated with a social network accessed over a network. A request is received for defining a mobile application for the community. A plurality of content options are defined for the mobile application. The content options for including the content are obtained directly from the community and from content for the mobile application. The mobile application is produced with the plurality of content options and associated with a sharing link that is accessible by mobile device for download over the network. Community content is sent to the mobile application in response to requests for updates from the community received from the mobile application. The community content is customized for a user profile when accessed by the mobile application.

17 Claims, 6 Drawing Sheets

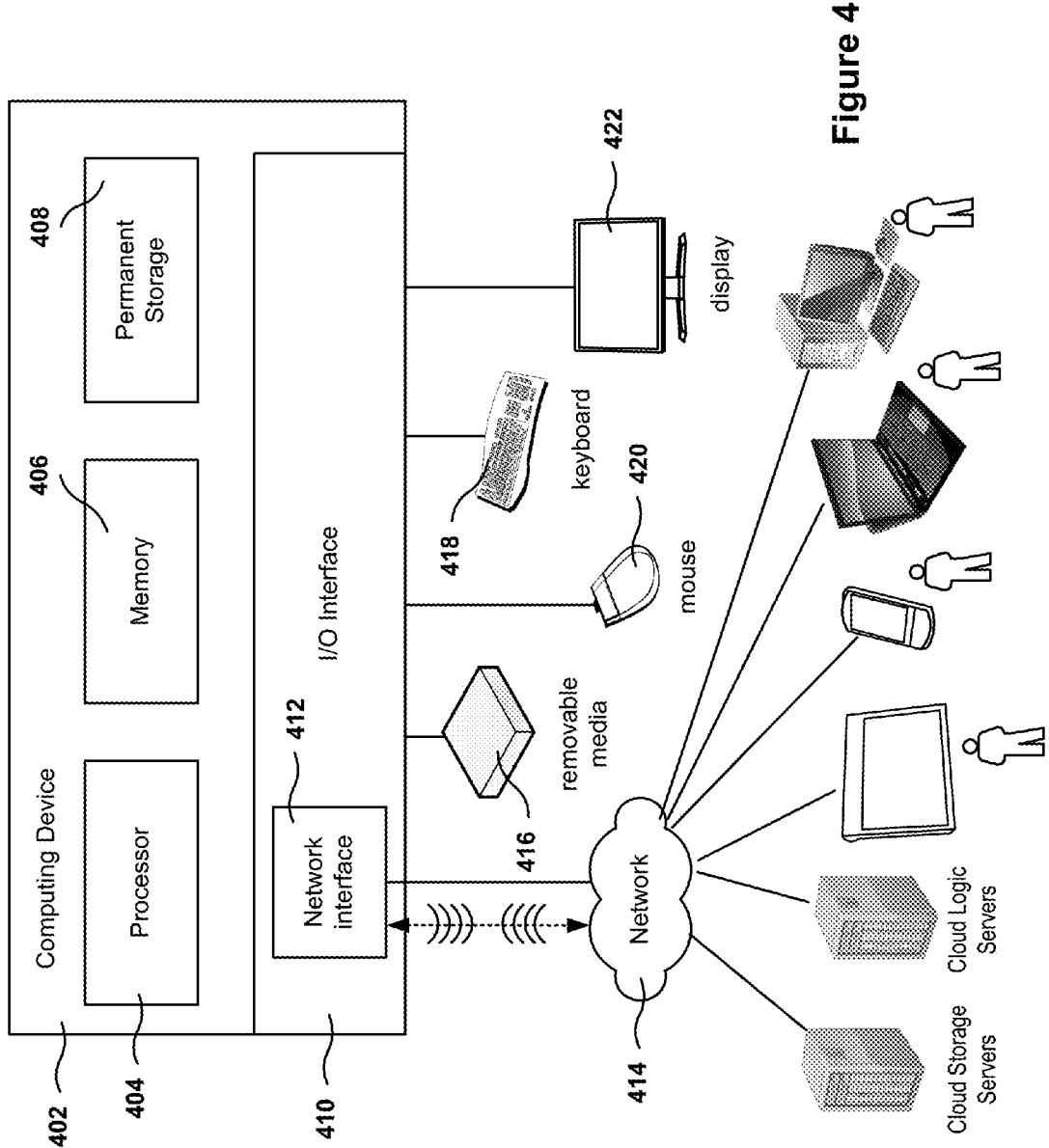

AUTOGENERATION OF APPLICATION FOR A SOCIAL NETWORK

FIELD OF THE INVENTION

The present disclosure relates to methods, systems and computer programs for generating application within a social network.

BACKGROUND

The communication capability provided by social networks has opened up various forms and modes of communication in today's society, making it easier for people to communicate with each other, as well as providing vehicles of communications between people, between people and businesses or among people within community groups. As people's interest in using social networks as a mode of communication has grown, so have the opportunities for social interaction.

Generally speaking, social interactions are performed within the context of a social network. Users are also given additional options to perform social interactions in other websites that are directed to specific topics of interest. As the number of social contacts and social interactions continue to grow within the social network, the topics of discussion amongst the social contacts become more varied. Consequently, the social interactions related to different topics become interspersed within a discussion thread of the social media of a user making it difficult for the user to follow the interactions related to specific topics. Even when the user is able to identify the social interactions for a specific topic, the user may only be interested in the social interactions related to specific sub-topic threads within the topic. Currently, there is no easy way to isolate specific ones of the social interactions related to selected ones of the topics/sub-topics within a topic of interest for presenting to the user. Further, there is a growing trend of using mobile devices as the primary devices to access the social network.

Considering that the number of social networks and options for social interaction keep growing, it would be beneficial to have ways to easily access the social interactions for specific topics of interest for a user from mobile devices without having the user to actually access and view the entire discussion thread that covers various different topics. It is in this context that embodiments of the invention arise.

SUMMARY

Embodiments of the present disclosure provide methods, systems, and computer programs for generating an application for sharing with users. The application is a mobile application that is generated for sharing community content related to a topic of interest within the community. The application is generated using content options for including content that are obtained directly from the community and that are specific to the mobile application. The generated mobile application, when downloaded on a mobile device, is used to request and receive community content updates for the topic of interest. The community content for the mobile application may be customized based on the user's interaction pattern for the mobile application or for the topic of interest in the community. It should be appreciated that the present disclosure can be implemented in numerous ways, e.g., a process, an apparatus, a system, a device or a method on a computer readable medium. Several embodiments of the present disclosure are described below.

In one embodiment, a method is disclosed. The method includes the following method operations: identifying a community for sharing community content related to a topic of interest, wherein the community is associated with a social network accessible over a network; receiving a request to define a mobile application for the community; defining a plurality of content options for the mobile application, wherein the plurality of content options for including community content are obtained from the community and include content options that are specific for the mobile application; producing the mobile application having the plurality of content options, wherein the mobile application is associated with a sharing link, the sharing link is accessible by mobile device for download over the network; and sending community content to the mobile application in response to request for updates from the community received from the mobile application, wherein the community content is customized for a user profile when accessed by the mobile application.

In one embodiment, the request to define the mobile application is received from a moderator of the community.

In one embodiment, the plurality of content options define rules of interaction and communication for the community.

In one embodiment, the sharing link is provided as an Uniform Resource Locator (URL), a quick response (QR) code, a weblink, an icon, a text, a voice, an email with text, an email with link, or any combinations thereof.

In one embodiment, the community content is sent to a mobile device on which the mobile application has been downloaded and from where the access requests to the mobile application are initiated.

In one embodiment, the community content sent to the mobile device is customized based on content options selected by the moderator and user profile, the user profile defined by mobile device settings and the user preferences related to the content of the mobile application.

In one embodiment, the user profile is defined by user credentials provided at the mobile device used for accessing the mobile application, the user profile for the mobile application is refined over time based on the user's interactions related to the mobile application within the community.

In one embodiment, the community content is sent to a user on any mobile device on which the mobile application is downloaded, the community content customized based on the user credentials provided at the mobile device for accessing the mobile application.

In one embodiment, the user's credentials are obtained from a cookie maintained by the mobile application on the mobile device or from a temporary storage area on the mobile device used for accessing the mobile application.

In one embodiment, a mobile application for a sub-topic is spawned from the mobile application for the topic of interest based on exhibited interest to the sub-topic from the community. The mobile application for the sub-topic shared with the community using a sharing link. Community content related to the sub-topic are sent to the spawned mobile application in response to requests for updates from the community received from the spawned mobile application. The community content is customized for a user profile when accessed by the spawned mobile application.

In one embodiment, a system is disclosed. The system includes a memory that is configured to store program instructions of a mobile application generator. The system also includes a processor that is configured to identify a community for sharing content related to a topic of interest within a community, wherein the community is associated with a social network accessible over a network; receive a request to define a mobile application for the topic of interest in the community; define a plurality of content options for the mobile application, wherein the plurality of content options are defined for including content obtained directly from the community and content that is specific for the mobile application; produce the mobile application having the content options and associate the mobile application with a sharing link, wherein the sharing link can be accessed by a mobile device for download over the network; and send community content to the mobile application in response to request for updates from the community received from the mobile application downloaded on a mobile device, wherein the community content when accessed by the mobile application, is customized for a user profile of the mobile device.

In one embodiment, a non-transitory computer-readable medium is disclosed. The computer-readable medium includes program instructions, which when executed by a processor performs a method. The program instructions include, program instructions for identifying a community for sharing community content related to a topic of interest, the community associated with a social network accessible over a network; program instructions for receiving a request to define a mobile application for the community; program instructions for defining a plurality of content options for the mobile application, the plurality of content options for including content obtained directly from the community and from the content that is specific to the mobile application; program instructions for producing the mobile application having the plurality of content options, the mobile application is associated with a sharing link, wherein the sharing link is accessible by mobile device for downloading over the network; and program instructions for sending content to the mobile application in response to requests for updates from the community received from the mobile application, wherein the community content is customized for a user profile when accessed by the mobile application.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 4 illustrates a basic infrastructure of a computing device used in processing data obtained from a plurality of users in a social network, in one embodiment of the invention.

DETAILED DESCRIPTION

Figure 1:
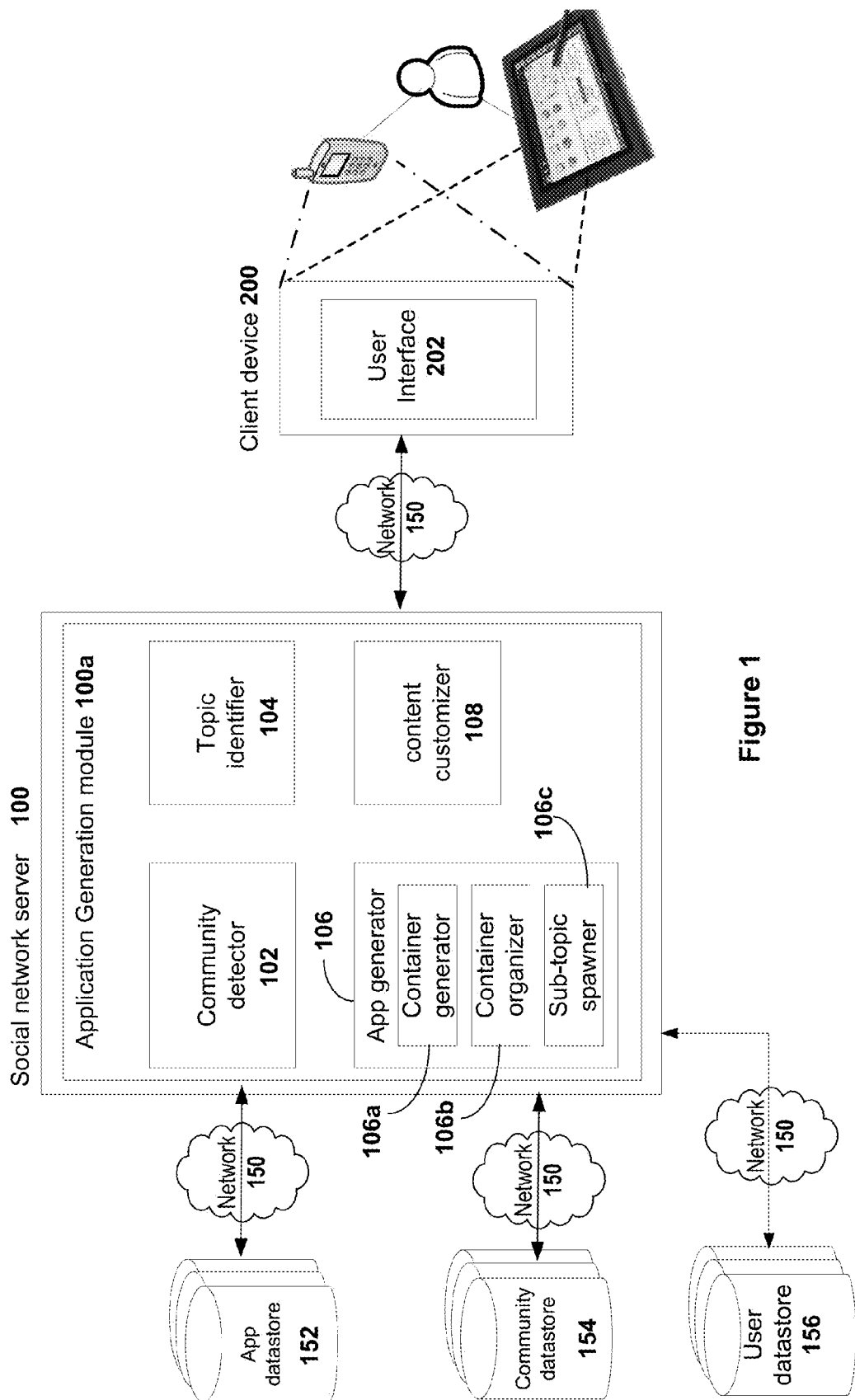
FIG. 1 illustrates an example architecture of a system for implementing embodiments of the disclosure, in accordance with embodiments of the present disclosure.

The following embodiments describe methods, computer programs, and systems for generating an application that is configured to obtain and/or share information related to a topic of interest within a community of users of a social network. The application is generated by identifying a topic of interest shared in social interactions by a community of users within a social network and creating an application to provide access to content within the community related to the topic of interest and access to a set of interaction tools for social interaction. A user can download the application and use the interaction tools to interact with other users/content and generate content for the community. The application can be a mobile application that can enable access to the content generated by the community of users without having to access a full website associated with the community.

The mobile application is generated by a moderator of the community based on community interactions. During the generation of the mobile application, the moderator may be presented with a plurality of content options to define for the mobile application. The content options define communication and interaction rules as well as control tools for providing content for the community. The content options may be obtained directly from the community. The content options may also be defined for the content specific for the mobile application. The content option selection received from the moderator of the community is used to create the mobile application. A sharing link is provided for sharing the mobile application with the community. Users of the community can access and download the mobile application using the sharing link. The sharing link may be in the form of a uniform resource locator (URL) link, a quick response (QR) code provided in a social media stream, QR code provided on a website, a weblink, an icon, a text, a voice, an email with text or link, or can be obtained from an online application store. The mobile application provides community content updates from the community that is related to the topic of interest. The mobile application also provides interaction tools to enable social interactions amongst the members of the community and such interactions are updated to the community and shared with other users. As the community of users grows in popularity, use, and membership, the users discussion may broaden within the community to newer topics/sub-topics. As a result, the mobile application may evolve from a simple mobile application with a topic of interest into a mobile application with growing menus and/or categories. Additional mobile applications may be spawned from the current mobile application to cover newer topics or sub-topics based on the evolution of the topics and the interests of the members of the community.

Each member of the community that has downloaded the mobile application may be provided with a customized content for the topic of interest. Content for the customized view may be identified based on the respective member's interest exhibited through the member's interaction toward specific ones of the sub-topics of the content within the community.

In summary, a basic mobile application can be autogenerated for a topic of interest in a community based on the popularity of the topic within the community, popularity of the community, community use, membership within the community, etc., and the mobile application can grow in menus and categories. As the topic associated with the mobile application shifts, additional mobile applications may be spawned for sub-topics based on the growing interactions and popularity of the sub-topic within the community.

FIG. 1 illustrates a generic system that employs an application generation module for processing user data within the community to identify a topic of interest and for generating a mobile application for the topic of interest, in one embodiment of the invention. As illustrated, the system includes a client device 200 with a display device 202. The client device 200 is a mobile computing device, such as a smart phone, table computer, or any other mobile computing device, that is capable of connecting to a social network over the Internet. The social network defines a network of users/members, communities, business or other entities that are connected over a social grid based on social interactions. The client device is configured to access and download a mobile application generated for the topic of interest. The downloaded mobile application provides access to community content defined for the topic of interest and interaction tools for interacting with the content/members of the community. The community content related to the topic is obtained over a network 150, such as the internet. The interactions related to the content/member at the client device are captured and updated to the community for sharing with other users. The display device 202 is used to render a user interface that is configured to capture the user interaction and to render community content related to the mobile application that is generated by the community of users within the social network.

The system includes a server device, such as a social network server 100, in one embodiment, that includes a processor (not shown) for executing a plurality of applications. One of the applications executing on the server device is an application generation module 100a. The processor of the server device is configured to retrieve and execute the programming instructions of the application generation module 100a from a memory of the server device. The application generation module 100a includes a plurality of modules that are used to identify a topic of interest within the community and to generate a mobile application for sharing with the users of the community. Some exemplary processing modules within the application generation module 100a include a community detector module 102, a topic identifier module 104, an app generator module 106 and a content customizer module 108. The above list of processing modules are exemplary and should not be considered restrictive. Fewer or additional modules may be included so long as the functionality of the application generation module is preserved. Additionally, two or more of the modules may be integrated into a combined module providing the functionality of the combined modules.

The topic identifier module 104 is configured to analyze the social interactions of the members within the social network to identify a topic of interest that is shared by members of the community. The topic identifier 104 may also identify the content options for the topic of interest defined within the social network. The topic identifier module 104 shares this information with the community detector module 102 and the app generator module 106.

The community detector module 102 is configured to identify community of users that are generating and sharing information within the social network for the topic of interest identified by the topic identifier module 104. The identified members form the community of users within the social network for sharing community content related to the topic of interest. Information related to the members of the community may be shared with the app generator module 106 for sharing an mobile application. Throughout this application, members and users are used interchangeably.

The app generator module 106 is configured to receive a request to define a mobile application for the community of users and, in response, generate the mobile application for the topic of interest. The request may be initiated by a moderator of the community based on the interactions related to the topic of interest within the social network. The app generator module 106 generates a mobile application for the topic of interest identified by the topic identifier module. During the generation of the mobile application, the app generator module 106 may identify a plurality of content options that are appropriate for the community and for the content exchanged for the topic of interest in the community and provide a list of the content options for selection by the moderator. The content options may be related to content related to the topic of interest or may be provided by the moderator and may specify interaction and communication rules, regulations and preferences that are acceptable to the community as a whole. The content options related to the content may be identified from the information provided by the topic identification module 104 and such information may include content specific interactions allowed for the topic of interest. Some exemplary content options provided by the moderator may include type and form of content that are acceptable, type of interactions allowed, type and frequency of communication notifications allowed and provided, etc. The moderator's selection of content options are used to define various attributes of the mobile application generated by the app generator module. The generated mobile application for the topic of interest is presented to the users of the community for downloading.

Members of the community may download the mobile application and request updates or interact with the community. Each member's interactions and requests for updates may be in accordance with the respective user's profile defined for the mobile application. A member, after downloading the mobile application on the member's mobile device, may provide his interaction and update preferences for the mobile application. Additionally, the user's preferred settings at the mobile device may also be used to determine the member's preferences. The user preferences may also be defined by user's interactions within the community. The member's preferences and device settings are captured within the member's user profile. When a user accesses the mobile application on the mobile device, the user's credentials at the mobile device on which the mobile application is downloaded, may be used to identify the member and to automatically identify the member's user profile specifying the device settings, interaction and community content update preferences, etc., defined for the mobile application. Community content is served to the member in accordance to the member's user profile. The preferences defined by the members in their user profile have to adhere to the standards set by the moderator for the community and are used to customized community content for the members within the community. Some of the preferences that are used in customizing the community content may include preferred frequency of updates, preferred type of updates, type of content to include in the updates, interactions associated with preferred members of the community, etc. For example, the member may prefer interactions related to a price or cost of a product, which may be the topic of interest, and notifications for any related sales within the member's preferred geo location. As a result the member's preferences may identify price/cost and sales in geo location in their preferences for receiving community content updates. In another example, the member may interact with another specific member of the community or may like the postings by the specific member and such information may be captured in the member's preferences for receiving updates.

Figure 2A:
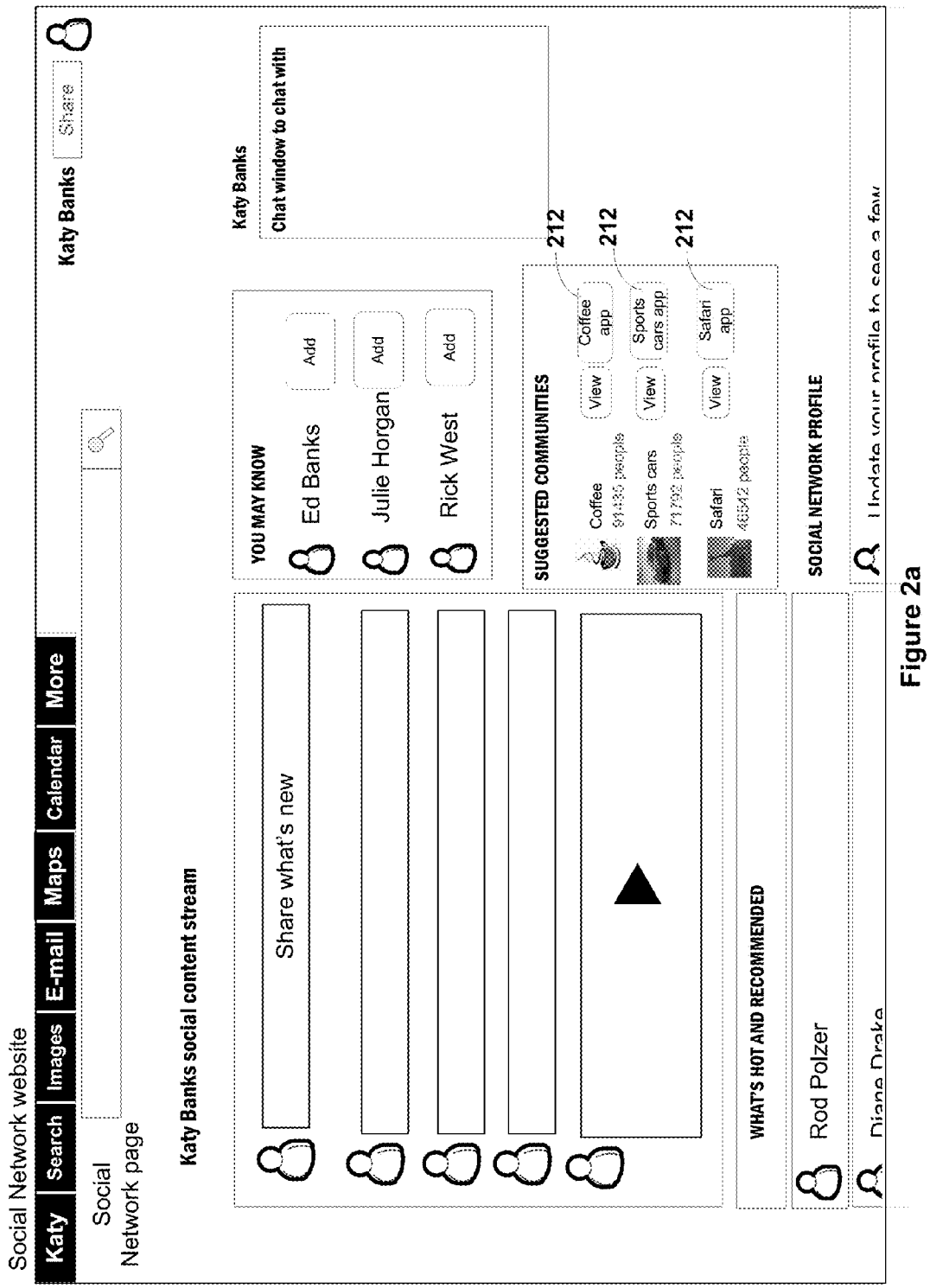
FIGS. 2a-2c illustrate exemplary views of different options available to a user to access and download the application on to a client device, in accordance with different embodiments of the invention.
Figure 2B:
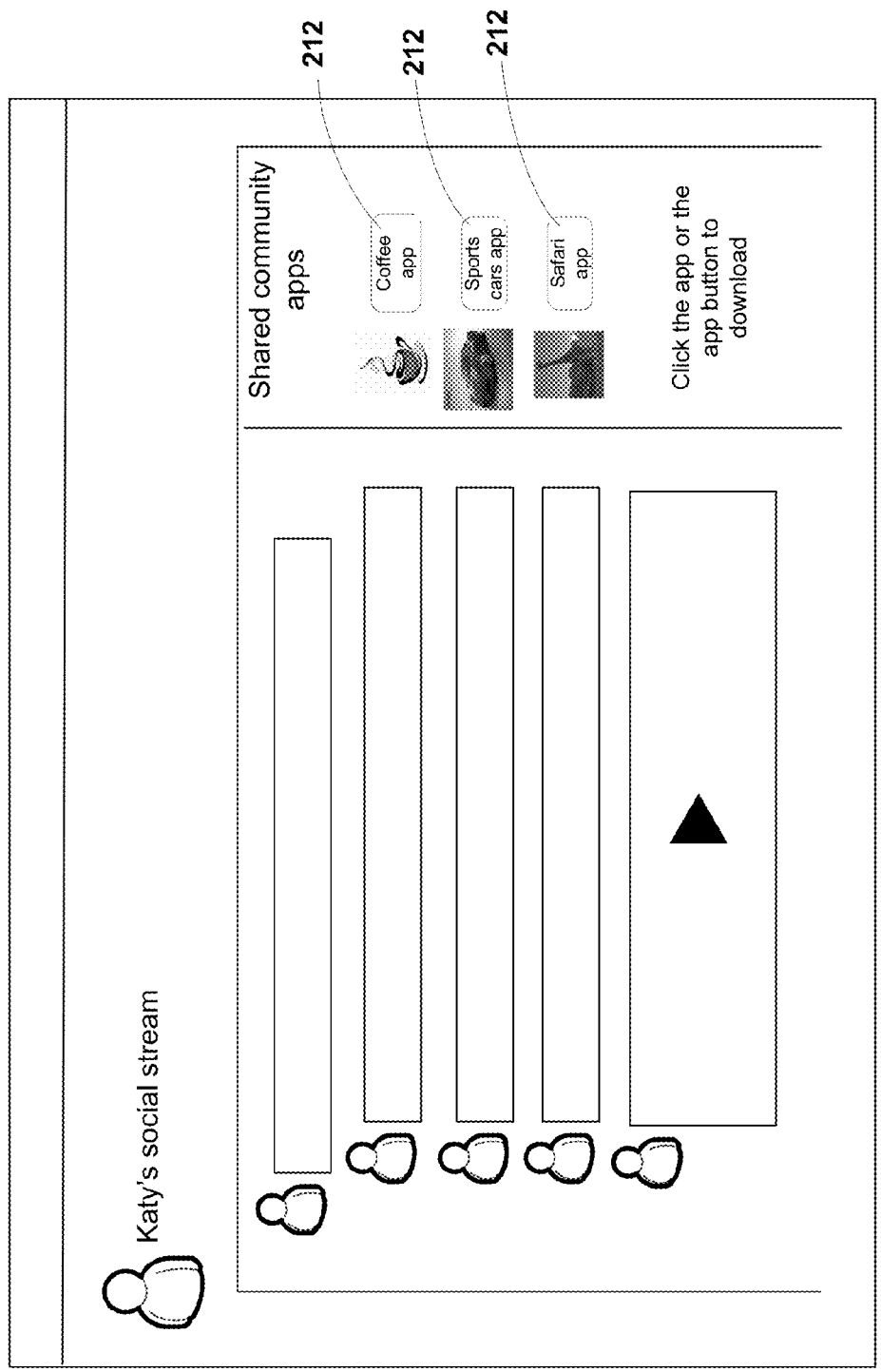
Figure 2C:
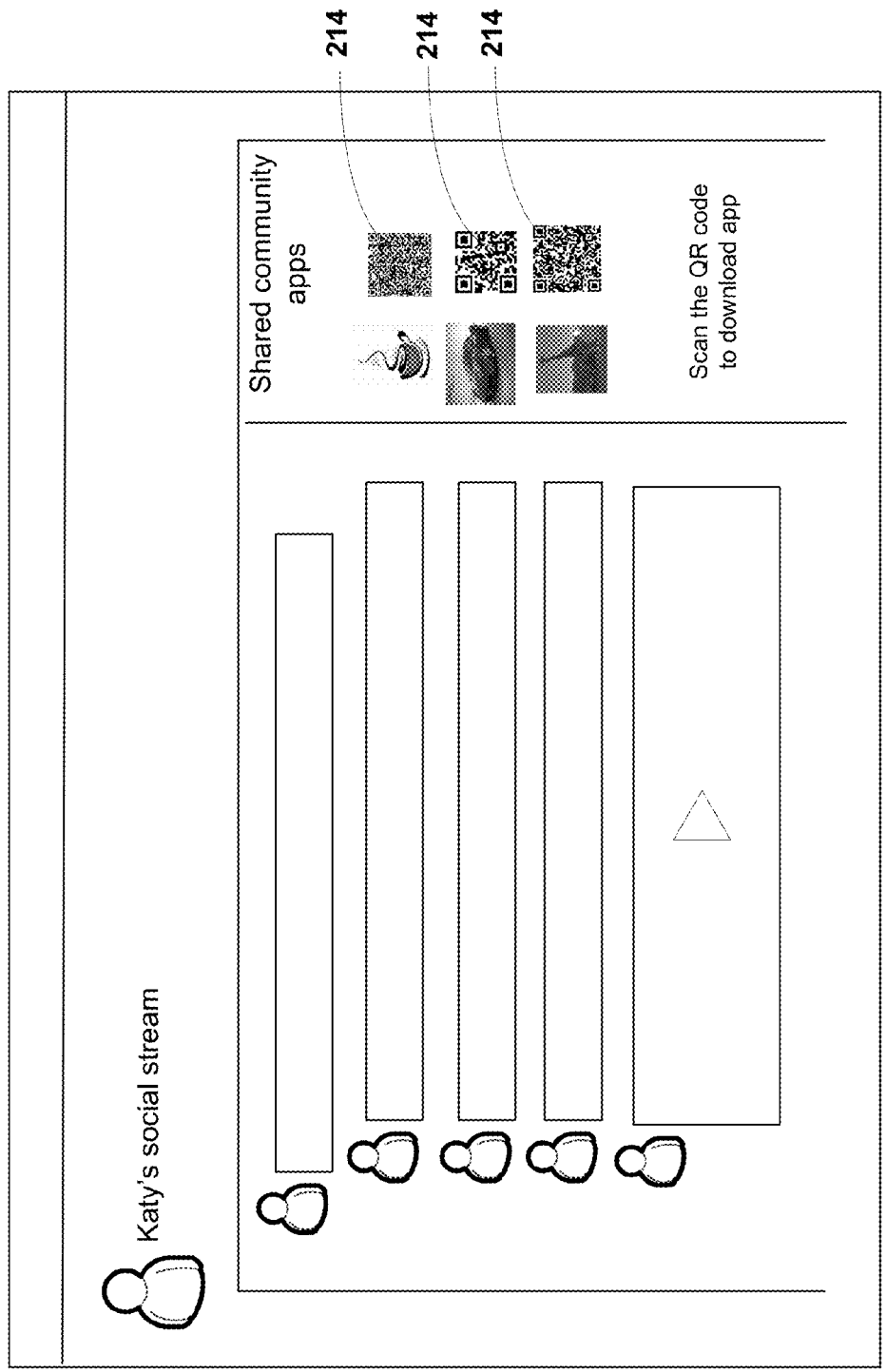

The mobile application, in one embodiment, can be presented as a downloadable link 212 within a social network website, as illustrated in FIG. 2a, or within a social media stream of a user, as illustrated in FIG. 2b. The application can also be presented as a scannable code 214 within a social media stream of a user or within a social network website. FIG. 2c illustrates an embodiment of the invention, wherein the application is presented as a scannable quick response (QR) code 214 within a social media stream of a user.

When a member of the community selects to download the mobile application on the client device or requests updates by accessing the already downloaded mobile application on a mobile device, the application generation module 100a identifies the member using the user credentials at the mobile device, determines the member's user profile and presents the community content for the topic of interest in accordance to the member's preferences defined in the user profile. Accordingly, the app generator module 106 of the application identifies the content related to the topic of interest within the community at the social network server, organizes the content and returns the content to the member for presenting at the member's mobile device. In one embodiment, the request from the member may be received from any mobile device. In this embodiment, the member's credentials when accessing the mobile application may be used to present the community content. When the member's credentials have not been provided, the mobile application may use the credentials stored in a cookie for the mobile application or in a temporary storage area accessible to the mobile application. Using the member's credentials, the mobile application may identify the member's user profile and service the request in accordance to the user's profile.

In one embodiment, the app generator module 106 may employ one or more sub-modules to organize the content related to the topic of interest for presenting to the user. Some exemplary sub-modules include a container generator module 106a, a container organizer module 106b and a sub-topic spawner 106c that act to organize the content related to the topic of interest for presentation to the member when the member accesses or selects to download the mobile application from the mobile device.

The container generator module 106a, in one embodiment, analyzes the content within the community that is related to the topic of interest and generates containers for organizing the content, based on the analysis. As members interactions within the community grows, the categories/menus within the topic of interest also grows, wherein each category/menu may relate to a specific sub-topic within the topic of interest. The growth of the community and the evolution of topic over time may result in the identification and spawning of additional sub-topics for the topic of interest. The sub-topic spawner 106c may obtain analysis results from the container generator module 106a, detect the evolving user interactions for the topic, identify and spawn additional sub-topics within the topic of interest. The community content related to the sub-topics are presented to the members of the community when requested for the mobile application. The spawning of additional sub-topics within the topic of interest may result in the generation of one or more mobile applications for the sub-topics.

The container generator module 106a may interact with the sub-topic spawner 106c and respond to the growth in the categories/menus within the topic of interest of the social network by generating additional containers to organize the content related to the additional sub-topics resulting from the growing categories/menus for the topic of interest. In one embodiment, one or more sub-topics (i.e., categories/menus) may relate to one or more members interest. For example, if a topic of interest within the community is related to the subject "coffee", then the sub-topics within the coffee topic, based on the analysis of the members social interactions in the community, may relate to coffee price, a coffee flavors/brands, best coffee machines, health benefits related to coffee, etc. The container generator module may use the information from the analysis to identify categories related to the coffee price, coffee flavors, coffee machines, health benefits sub-topics and generate corresponding containers for organizing the content related to the respective categories.

In one embodiment, the container organizer module 106b receives the analysis results from the container generator module 106a including container information for the generated containers and organizes the content related to the different categories/sub-topics within the topic of interest under the corresponding containers. In this embodiment, each container includes content that is related to a specific menu/category. In an alternate embodiment, each container may accommodate content related to multiple categories. In this embodiment, the containers may be organized based on temporal attribute of the content, geo-location attribute of the content, geo location of the members contributing the content, or any other attribute related to the content.

In one embodiment, the container organizer module 106b may include a ranking algorithm to rank the different containers based on the content contained therein. The ranking algorithm may take into consideration the popularity of the content category amongst the members of the community. The popularity of the content category, in one embodiment, may be determined by the number of social interactions, such as likes, dislikes, comments, posts, etc., that are logged for the category. The container organizer 106b may use the relative ranking to organize the containers for presenting at the mobile device of the member, in one embodiment. In an alternate embodiment, the app generator 106 may organize the content within the community based on the popularity of the content within the community. In this embodiment, the content is presented in a ranking order within a content stream and may not be organized into containers according to the sub-topics. The moderator of the mobile application may provide input for organizing the content for presenting to the members of the community.

The app generator 106 may retrieve content information related to the topic of interest from the community datastore 154, organize and present the content to the user at the mobile device 200. In addition to organizing the content for the community, the application generation module 100a may customize the community content for each member of the community based on the respective member's user profile. In one embodiment, the application customizer module 108 may be used to customize the content for each member of the community. In this embodiment, the application customizer 108 may interact with the user datastore 156 to obtain user profile information for each member of the community for the mobile application, identify the community content in accordance to the user profile of each member, organize and present the customized content to each member. By collecting and presenting content based on user profile, the community content presented to each member matches the respective member's interest.

In one embodiment, the application customizer module 108 may interact with the container organizer 106b of the application 106 to retrieve containers with content related to one or more sub-topics that match the member's interest and present the containers in a specific order at the member's mobile device. In one embodiment the container's are presented based on the containers' relative ranking within the community. In another embodiment, the containers may be presented in an order based on the member's interactions within the community as reflected in the member's preference defined within the user profile. For instance, if the community member interacted with posts that related to the coffee price more than the posts related to the coffee brands/flavors, in the coffee example defined above, the container related to the coffee price sub-topic may be ranked higher and presented more prominently than the container related to the coffee brands/flavors.

The mobile application can also be used for social communication within the community, such as notifications of events related to the topic of the community, notifications related to a virtual meeting for the members of the community to exchange information related to the topic. In other words, the mobile application provides a virtual communal group hang-out for members that express interest in the topic accessible through the mobile device.

Continued interactions of the members for the topic of interest are captured and recorded in substantial real-time within the community datastore. These interactions are used to refine each member's user profile stored in the user datastore. The mobile application, in response to the request for community content from members of the community, retrieves the most up-to-date user profile of the members requesting such content, retrieves the community content in accordance to the user profile and provides the most up-to-date customized content. The community content provided to each member is defined by the respective member's interest to the various sub-topics/categories within the topic discussed within the community.

Figure 3:
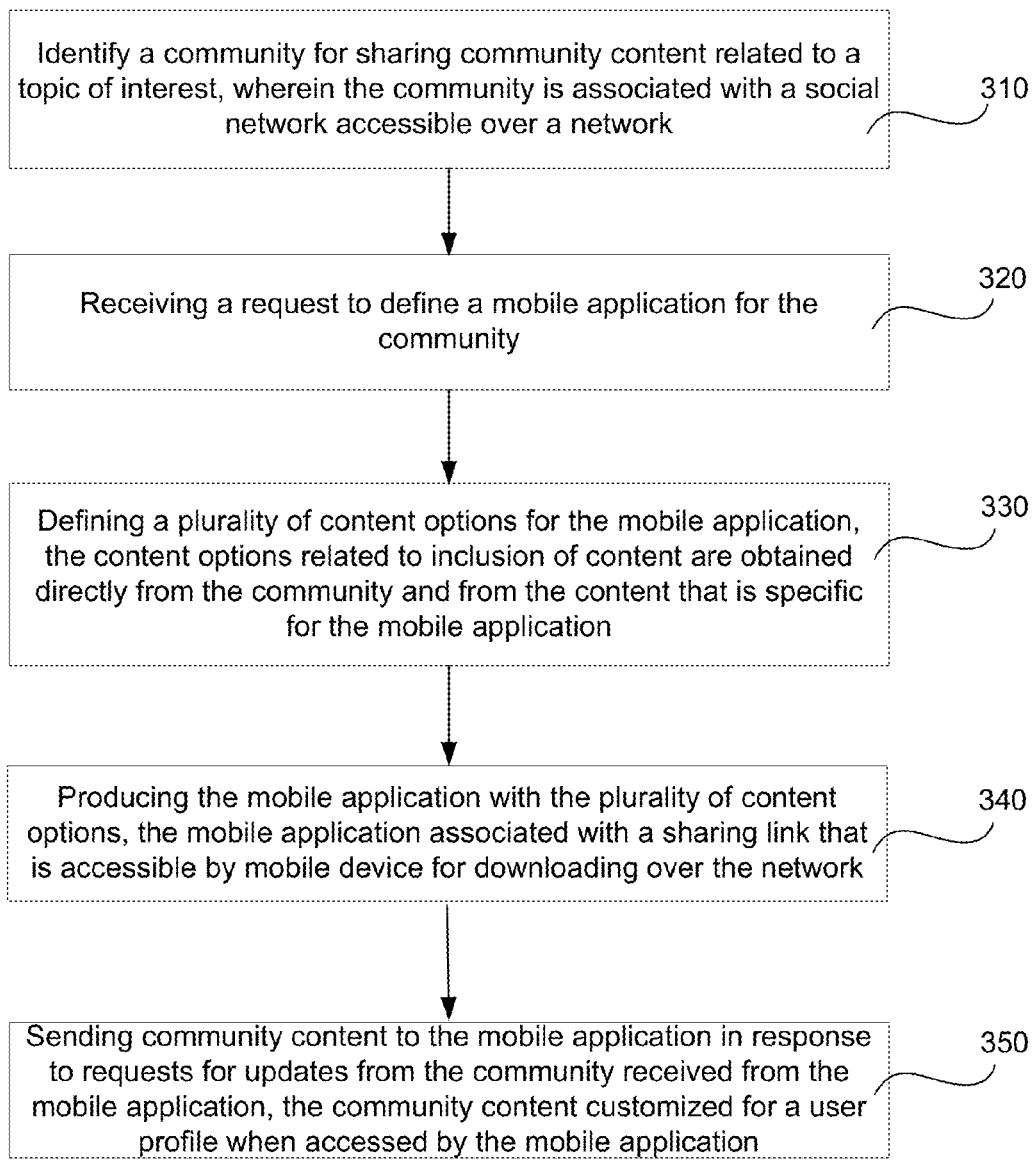
FIG. 3 illustrates exemplary method operations used for generating an application for sharing with users of a social network, in accordance with an embodiment of the invention.

With the above detailed description of the various embodiments, the method for generating an application for sharing with users of a community will now be described with reference to FIG. 3. The method begins at operation 310 with the identification of a community for sharing community content related to a topic of interest. The community is associated with a social network accessible over a network, such as the Internet. The topic of interest may be detected by analyzing the content generated and/or shared by the users within the community. A request is received for defining a mobile application for the community, as illustrated in operation 320. The request may be initiated by a moderator of the community. In response to the request, a plurality of content options for the mobile application are defined and presented for selection, as illustrated in operation 330. The content options may be obtained directly from the community by an application generation module executing on the server, by analyzing the content and interactions within the community. The content options are used to specify the interaction and content related rules, regulations and preferences defined within the community. Selection of content options for providing content is received at the application generation module. In response, the application generation module produces the mobile application with the selected ones of the plurality of content options, as illustrated in operation 340. The generated mobile application may be associated with a sharing link that is accessible by mobile devices for download over the network. In response to requests for updates from the community received from a mobile device, community content is sent to the mobile application at the mobile device. The request for updates may be in response to downloading of the mobile application on a mobile device or the request for update may be from a mobile device on which the mobile application has already been downloaded. The community content provided to the mobile application is customized for a user profile associated with the mobile device, as illustrated in operation 350.

The community content for the topic of interest may grow and evolve over time based on the members continued interaction within the community. In such case, the mobile application will refine the user profile of each of the members to reflect the up-to-date user profile defined by the interactions, revise the content presented to each member to include the evolving content that relates to one or more sub-topics of interest within the topic of interest in accordance to the user profile.

The content of the application may also evolve resulting in shifting in the topic of interest. In such a case, the application generation module will detect the change or shift in the topics and automatically spawn off additional mobile applications for the one or more newly evolved topics from the existing mobile application to enable capturing of the community content related to the newly evolved topics. The members (i.e., users) of the community may be provided access to the spawned mobile applications. Members interactions at the community content are captured for the newly spawned mobile applications and used to customize content for each member based on the respective members exhibited interest as defined in the respective member's user profile.

The various embodiments provide several advantages. One advantage is the current embodiments provide a tool to auto-generate a mobile application for a topic of interest shared by member of a community within a social network and enable sharing of the application with members of the community. The members are able to access the content directly from the social network using the mobile application without having to connect to a full website associated with the community. A user may provide input to define preferences for accessing and viewing the community content, and such preferences are translated by the mobile application to provide customized community content for the topic of interest based on the user profile, thereby enriching the user's social experience. Other advantages will become apparent to one skilled in the art upon reviewing the various embodiments described herein.

FIG. 4 is a simplified schematic diagram of a computer system for implementing embodiments of the present disclosure. It should be appreciated that the methods described herein may be performed with a digital processing system, which in one embodiment may be a conventional, general-purpose computer system. Special purpose computers, which are designed or programmed to perform only one function, may be used in the alternative. A computing device 402 includes a processor 404, which is coupled through a bus to memory 406, permanent storage 408, and Input/Output (I/O) interface 410.

Permanent storage 408 represents a persistent data storage device, e.g., a hard drive or a USB drive, which may be local or remote. Network interface 412 provides connections via network 414, allowing communications (wired or wireless) with other devices. It should be appreciated that processor 404 may be embodied in a general-purpose processor, a special purpose processor, or a specially programmed logic device. Input/Output (I/O) interface 410 provides communication with different peripherals and is connected with processor 404, memory 406, and permanent storage 408, through the bus. Sample peripherals include display 422, keyboard 418, mouse 420, removable media device 416, etc.

Display 422 is configured to display the user interfaces described herein. Keyboard 418, mouse 420, removable media device 416, and other peripherals are coupled to I/O interface 410 in order to exchange information with processor 404. It should be appreciated that data to and from external devices may be communicated through I/O interface 410. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 408, network attached storage (NAS), read-only memory or random-access memory in memory module 406, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 414. Network 414 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method, comprising:
   identifying, by a processing device, a community and a plurality of topics of interest for the community, the community being associated with a social network accessible over a network, wherein identifying the plurality of topics of interest comprise analyzing social interactions of a plurality of users of the social network;
   automatically producing a mobile application for each of the identified plurality of topics of interest in response to the processing device identifying each of the plurality of topics, the mobile applications having a plurality of content options and being associated with sharing links;
   providing the sharing links to the identified community, the sharing links being accessible by a mobile device for download over the network; and
   sending community content to the mobile applications in response to requests for updates from the community received from the mobile applications, the community content being customized for a user profile when accessed by the mobile applications.

2. The method of claim 1 further comprising, receiving a request to define a mobile application for the community, wherein the request to define the mobile application is received from a moderator of the community.

3. The method of claim 1 further comprising, defining the plurality of content options for the mobile applications, the plurality of content options including content obtained directly from the community and content that is specific for the mobile application, wherein the plurality of content options define rules of interaction and communication for the community.

4. The method of claim 1, wherein one of the sharing links is provided as an Uniform Resource Locator (URL), a quick response (QR) code, a weblink, an icon, a text, a voice, an email with text, an email with link, or any combinations thereof.

5. The method of claim 1, wherein the community content is sent to the mobile device on which one of the mobile applications has been downloaded and access to the mobile application is initiated from the mobile device.

6. The method of claim 5, wherein the community content sent to the mobile device is customized based on content options selected by a moderator and the user profile, the user profile defined by mobile device settings and user preferences related to the content of the mobile application.

7. The method of claim 1, wherein the user profile is defined by user credentials provided at a mobile device used for accessing one of the mobile applications, wherein the user profile for the mobile application is refined over time based on the social interactions.

8. The method of claim 7, wherein community content is sent to a user on any mobile device on which the mobile application is downloaded, the community content customized based on the user credentials provided at the mobile device for accessing the mobile application.

9. The method of claim 8, wherein the user credentials are obtained from a cookie maintained for a mobile application on the mobile device or from a temporary storage area on the mobile device used for accessing the mobile application.

10. The method of claim 1, further includes spawning one or more sub-topics within one of the topics of interest, the spawning based on the social interactions.

11. The method of claim 10, further includes,
generating a mobile application for each of the one or more sub-topics within the topic of interest based on exhibited interest to the sub-topic from the community, the mobile application for the sub-topic shared with the community using a sharing link; and
sending community content related to the sub-topic to the mobile application in response to requests for updates from the community received from the mobile application, the community content being customized for the user profile when accessed by the mobile application.

12. A system, comprising:
a memory storing program instructions of a mobile application generator; and
a processor to execute the mobile application generator, the processor to:
identify a community and a plurality of topics of interest for the community, the community being associated with a social network accessible over a network, wherein to identify the plurality of topics of interest, the processor is to analyze social interactions of a plurality of users of the social network;
automatically produce a mobile application for each of the identified plurality of topics of interest responsive to the identification of each of the plurality of topics, the mobile applications having a plurality of content options and being associated with sharing links;
provide the sharing links to the identified community, wherein the sharing links can be accessed by a mobile device for download over the network; and
send community content to the mobile application in response to requests for updates from the community received from the mobile application downloaded on the mobile device, the community content being customized for a user profile of the mobile device when accessed by the mobile application.

13. The system of claim 12, further includes,
a user data store that is configured to store user profile of one of the mobile applications requesting updates to the community content; and
a mobile application data store configured to store content options and community content for the mobile application.

14. The system of claim 13, wherein the user profile is defined by obtaining user credentials presented at the mobile device used for accessing one of the mobile applications, wherein the user profile at the user data store is refined over time based on the social interactions.

15. A non-transitory computer-readable storage medium having program instructions, which when executed by a processor, cause the processor to:
identify a community and a plurality of topics of interest for the community, the community being associated with a social network accessible over a network, wherein to identify the plurality of topics of interest, the processor is to analyze social interactions of a plurality of users of the social network;
automatically produce a mobile application for each of the identified plurality of topics of interest responsive to the identification of each of the plurality of topics, the mobile applications having a plurality of content options and being associated with sharing links;
provide the sharing links to the identified community, the sharing links being accessible by a mobile device for download over the network; and
send community content to the mobile application in response to requests for updates from the community received from the mobile application, the community content being customized for a user profile when accessed by the mobile application.

16. The computer-readable medium of claim 15, including further program instructions that, when executed by the processor, cause the processor to spawn one or more sub-topics within one of the topics of interest based on the social interactions.

17. The computer-readable medium of claim 16, including further program instructions that, when executed by the processor, cause the processor to:
generate a mobile application for each of the one or more sub-topics spawned from the topic of interest based on exhibited interest to the sub-topic from the community, the mobile application for the sub-topic shared with the community using a sharing link; and
send community content related to the sub-topic to the mobile application in response to requests for updates from the community received from the mobile application, the community content being customized for the user profile when accessed by the mobile application.

* * * * *